Sept. 24, 1968     H. B. MOORE ET AL     3,402,881
AIRCLEANER AND SILENCER
Filed May 26, 1965                                   3 Sheets-Sheet 1
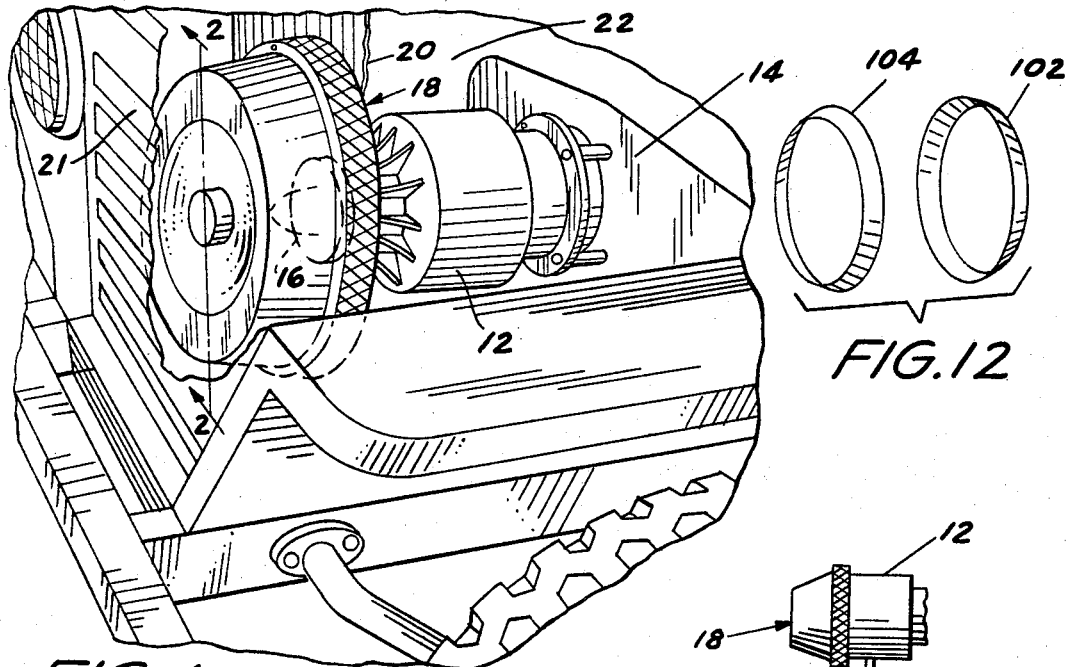
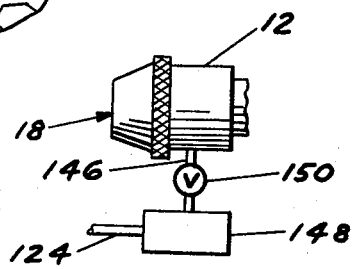
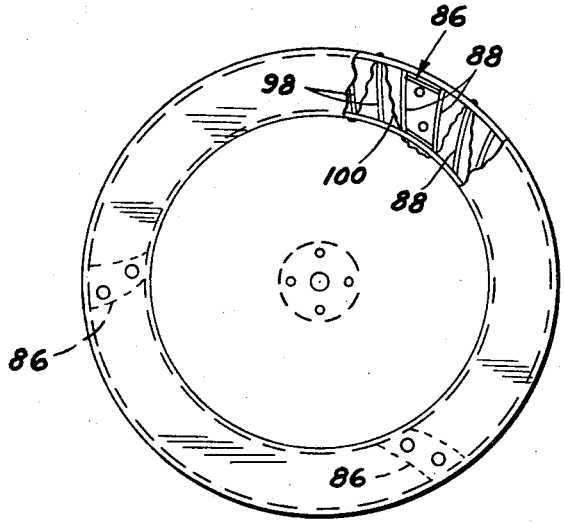
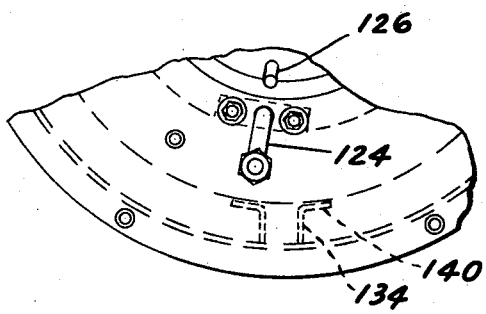
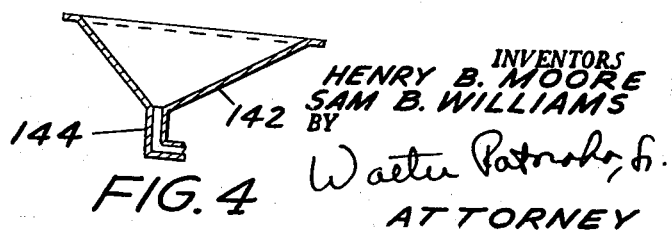
INVENTORS
HENRY B. MOORE
SAM B. WILLIAMS
BY
Walter Potroshy Jr.
ATTORNEY

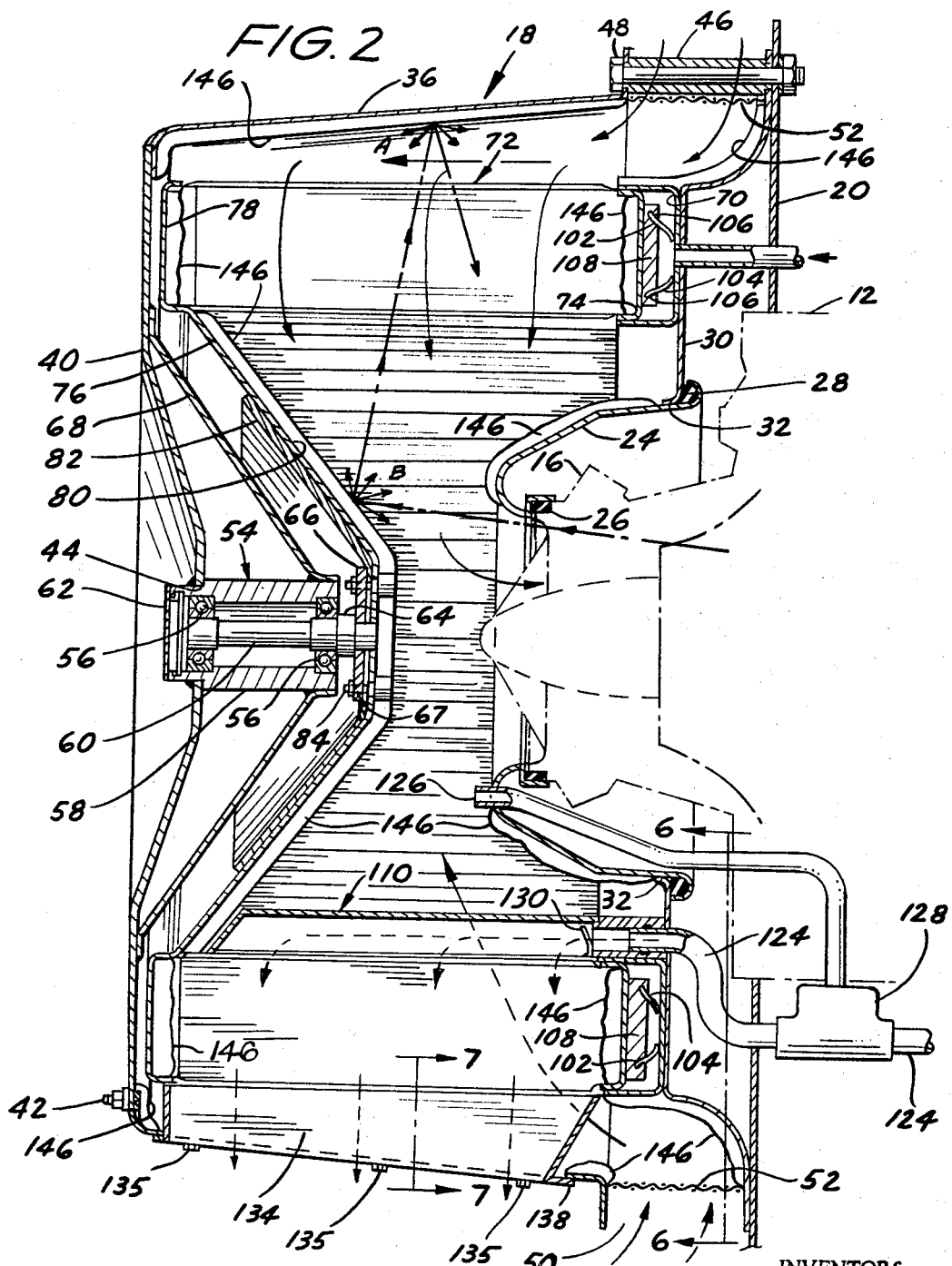

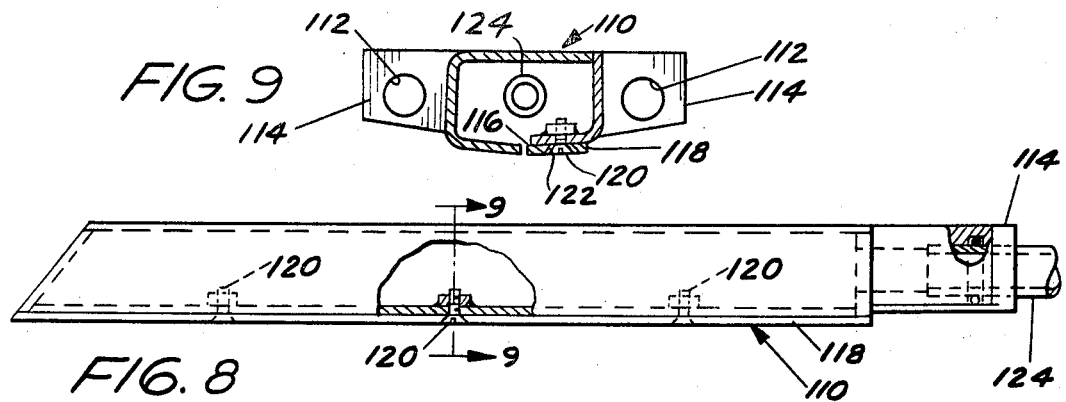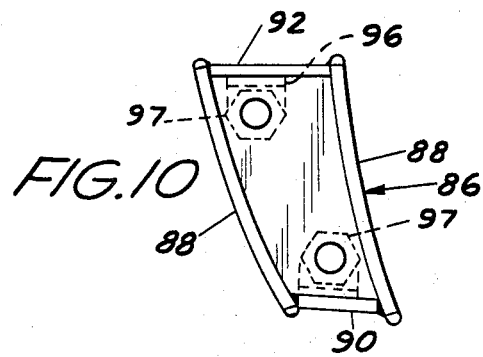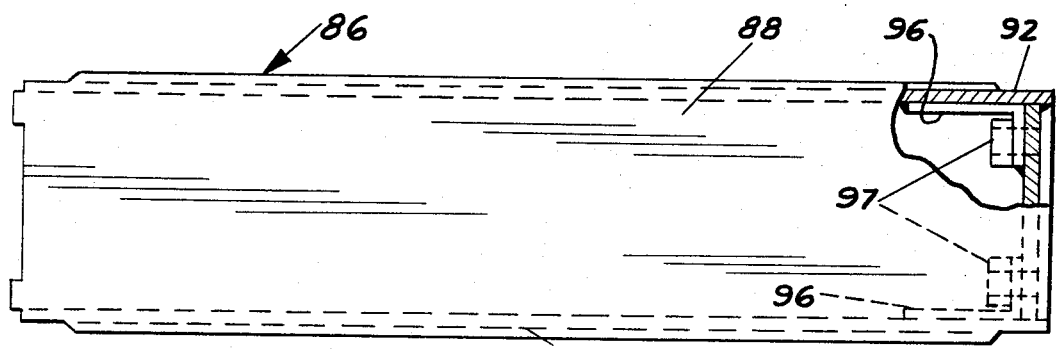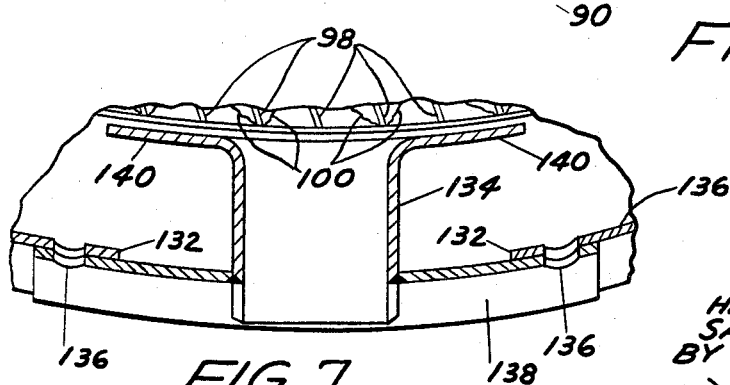

United States Patent Office 3,402,881
Patented Sept. 24, 1968

3,402,881
AIRCLEANER AND SILENCER
Henry B. Moore, Birmingham, and Sam B. Williams, Pontiac, Mich., assignors to Holley Carburetor Company, Warren, Mich., a corporation of Michigan
Filed May 26, 1965, Ser. No. 458,949
2 Claims. (Cl. 230—232)

ABSTRACT OF THE DISCLOSURE

A combination aircleaner and silencer device particularly adapted for mounting on a gas turbine engine having a circular air inlet, the device comprising a generally cylindrical housing having concentrically and rotatably mounted therein a generally cylindrical filter drum, the drum mounting mechanism being disposed entirely in a cavity formed in the front wall of the filter drum, the filter drum being dynamically sealed so that unfiltered air must enter through the periphery thereof comprising vanes over which the filter media is woven and the flow of air through which causes rotation of the drum at a rate related to engine speed, the inner surfaces of the drum being arranged to deflect cleaned air into the engine air intake and to prevent engine sound waves from leaving the aircleaner structure, the device also having intermittent self-cleaning means by which some engine compressor air is caused to back flow under sonic vibration through the filter media when the pressure within the aircleaner falls to a predetermined value.

This invention relates generally to aircleaners and silencers, and more particularly to a relatively high capacity, self-cleaning aircleaner and silencer for the relatively small automotive and industrial type gas turbine engines.

Recent developments in gas turbine powered vehicles, particularly of the heavy duty off-the-road type, suggests that vehicles of this type will be comercially available in the forseeable future. Also, much work is being done with passenger car and industrial gas turbine engine installations. While considerable development is being carried out on engines, relatively little attention has been focused on aircleaning and silencing systems for such engines, even though it is apparent that effort in this direction is necessary due to the effect of such systems on engine operation and space limitations in the vehicle.

Prime noise sources in gas turbines are the compressor inlet, exhaust gases and gearing, and one can theorize as to the various solutions that will be suggested to reduce or eliminate these noises. However, compressor inlet systems undoubtedly comprise a potentially profitable area to explore.

Specialized knowledge and equipment must be developed to prevent dirt and other foreign material from entering the engine inlet air and to suppress the high frequency noise issuing from the compressor inlet. The inlet silencing and cleaning system should perform these functions without distorting the compressor inlet flow conditions and with a minimum pressure drop, since both of these factors have a significant influence on engine power and fuel rate. Of course, the equipment should be designed for minimum space and weight which will still permit adequate fulfillment of the functional requirements.

It can be considered typical that silencing and aircleaning devices can be attached to the engine compressor inlet. The variations that can be anticipated in engines of various makes will certainly involve the diameter of the inlet, the detailed design of the flange for attachment (these will, no doubt, be standardized by the industry) and some details of overall engine compartment dimensions. Of course, the silencing and aircleaning components should be sized to accommodate the variations in air flow associated with different engine power ratings.

Although, as mentioned above, some equipment manufacturers are starting activities in this area, very little real progress has yet been made. Turbo-machinery is much more tolerant to dirt than piston engines, since there are no rubbing parts, such as rings and cylinder walls, exposed to the air and combustion products. On the other hand, both cooling air and the air for combustion go through the turbine engine; hence, it will digest roughly six times as much air as a comparable piston engine. Erosion of impeller and diffuser vanes and internal deposits noted in field and laboratory tests on prototype equipment have shown the necessity for removing dirt from the inlet air. Possible problems with regenerator fouling are not yet fully explored. Criteria for the amount and particle size of the dirt which must be removed have not been established. No qualitative noise data have been published on typical (regenerative) automotive engines. This is largely because of the non-availability of these engines, but it seems clear that aircleaning, as well as silencing, will be required.

General information indicates that the most common approach to dirt removal has been the cyclone type separator since pressure losses must be minimized. However, to date, due to inadequate consideration of aerodynamics, these have resulted in excessive pressure losses and compressor inlet flow distortion. Also, no approaches or procedures for adequate air inlet silencing have been advanced.

Accordingly, a general object of the invention is to provide an aircleaner apparatus for gas turbine engines.

Another general object of the invention is to provide an air inlet silencing apparatus for gas turbine engines.

Still another general object of the invention is to provide combined aircleaning and silencing apparatus for gas turbine engines.

A more specific object of the invention is to provide such apparatus that may be easily mounted on the engine air inlet, the apparatus being arranged compactly so as to utilize a minimum of space, particularly in the engine compartment of a gas turbine engine powered vehicle.

Another object of the invention is to provide such apparatus that includes a rotary self-cleaning filter element.

Another object of the invention is to provide such apparatus wherein the filter element is itself formed so as to be driven by flow of air to the engine, rather than by a special mechanical or other drive means.

Another object of the invention is to provide such apparatus wherein the structure thereof is such that any sound waves coming from the air inlet will be reflected from the various angled surfaces within the apparatus so as to prevent such sound waves from escaping to the atmosphere through the air entrance of the apparatus.

Still another object is to provide such apparatus wherein the inner surfaces thereof are coated with sound absorbing material to reduce the reflection of sound waves.

A still further object of the invention is to provide a novel pleated vane type rotary aircleaner element wherein the pleats are supported by the vanes that cause rotation thereof.

Another object of the invention is to provide such apparatus wherein self-cleaning is provided by the backflow of readily available air through said filter element as the periphery thereof passes a particular point in the air cleaner.

Another object of the invention is to provide such apparatus wherein the backflow of air may be controlled to occur only when a predetermined pressure drop across the filter element is reached due to accumulation of dirt thereon.

A still further object of the invention is to provide means for sonic vibration of the backflow air.

Still another object of the invention is to provide a novel dynamic seal between the moving and stationary portions of the aircleaner.

These and other objects of the invention will become more apparent by reference to the following specification and claims and the attached drawings wherein:

FIGURE 1 is a partial perspective view of a gas turbine engine powered vehicle having an aircleaner and silencer embodying the invention mounted on the engine air intake;

FIGURE 2 is an enlarged cross-sectional view of the aircleaner and silencer, taken on the plane of line 2—2 of FIGURE 1 and looking in the direction of the arrows;

FIGURE 3 is a schematic illustration of a possible arrangement for storing air for the self-cleaning function;

FIGURE 4 is a cross-sectional view of means for removal of dirt removed from the filter element;

FIGURE 5 is a front end elevational view, with portions thereof cut away and in cross section, of the rotary air filter element contained in the aircleaner and silencer;

FIGURE 6 is a fragmentary view of the rear end of the aircleaner to illustrate the relationship of the cleaning jet and dust collector portions thereof;

FIGURE 7 is a fragmentary cross-sectional view taken on the plane of line 7—7 of FIGURE 2, looking in the direction of the arrows;

FIGURE 8 is an enlarged side elevational view of the reverse or backflow cleaning jet shown in FIGURE 2, with a portion thereof cut away to better illustrate internal structure;

FIGURE 9 is a cross-sectional view taken on the plane of line 9—9 of FIGURE 8 and looking in the direction of the arrows;

FIGURE 10 is an enlarged end view of one of the spacing columns for the rotary filter element shown by FIGURE 5;

FIGURE 11 is a side view, with a portion thereof cut away and in cross section, of the column shown by FIGURE 10;

FIGURE 12 is a reduced perspective view of the seal rings shown in FIGURE 2, with portions cut away to better illustrate the structure thereof.

Referring now to the drawings in greater detail, FIGURE 1 illustrates the front end of a vehicle 10 powered by a relatively small gas turbine engine 12, the exhaust end of which is mounted in any suitable manner on the conventional fire wall 14 and the axis of which extends along the front to rear centerline of the vehicle. The details of construction of the engine are not important to the invention, except that the engine is constructed to provide an annular air intake 16. The proposed combined aircleaner and silencer 18 is mounted on the air intake 16 and to a mounting wall 20 as to be positioned between the engine 12 and the usual grill 21 at the front end of the engine compartment 22.

Referring now to FIGURES 1 and 2, it will be seen that the aircleaner silencer comprises a generally frustroconical structure adapted to be secured to the mounting wall 20 which is positioned behind the air intake portion of the engine, the wall substantially surrounding the engine and being perpendicular to the axis of the engine. It should be stated at the outset that since the combined cleaner and silencer device is of a frustro-conical configuration, most of the parts thereof are of a circular or annular configuration.

The inner rear portion of the device 18 comprises an adaptor member 24 providing means for connecting the same to the air intake, the annular resilient seals 26 and 28 being provided to prevent passage of air at these points.

The rear or engine end of the aircleaner 18 comprises a plate 30 having a central opening 32 to receive the adaptor 24 in a manner to compress the seal 28, the outer peripheral portion of the backplate being formed to curve backwardly and outwardly to provide a radial surface 34 to engage the mounting wall 20.

The peripheral and front portion of the device 18 comprises a frustro-conical shell 36 having a radially extending flange 38 at the rear end thereof and a circular front plate 40 which is secured by any means, such as welding or the bolts 42, to the smaller diameter front end of the shell, the front plate 40 being dished to an extent required to add rigidity and having a central opening 44 therein. The shell 36 and front cover 40 assembly is mounted in spaced, partially nesting relation with the rear end plate 30 by means of a plurality of spacers 46 having an opening therethrough to receive bolts 48 adapted to secure the device 18 to the mounting wall 20, the annular space 50 between the flange 38 and the radially extending portion 34 providing the air inlet into the cleaner. The air inlet 50 may be enclosed with a screen 52 to prevent entry of larger foreign particles.

A bearing and shaft assembly 54 is secured, by any means such as welding, in the central opening 44 in the front cover, the assembly including a pair of ball bearing assemblies 56 secured in spaced relation in the sleeve 58 and a shaft 60 mounted in the bearings so that the axis thereof is coaxial with the axis of the engine. The sleeve is closed at the front end thereof with any suitable cap 62, and the inner end 64 of the shaft extends beyond the inner bearing and has secured thereto a circular plate 66 having a suitable number of bolt openings 67. A conical support plate 68 is secured between the inner side of the front cover 40 and the inner end of the sleeve 58 to provide rigidity in the sleeve mounting.

With the structure above described, there is provided an aircleaner housing with a screened air inlet, the housing being removably fixed to the mounting wall 20. An annular channel member 70 is secured to the inner face of the rear plate 30 in a manner so that the channel is open toward the front of the device 18.

A rotatable filter drum assembly 72 is mounted on the circular plate 66 secured to the inner end of the shaft 60 so that it is free to rotate. The assembly 72 comprises an annular channeled rear member 74 received in the annular channel member 70 with sufficient clearance so that rotation of the assembly 72 is not interfered with, the alignment being enhanced by piloting plate 40, spacer 46 and plate 66 in the parts to which they are secured. The front end of the assembly 72 comprises a dished member 76 having an outer peripheral channel portion 78 of generally the same dimensions as the rear channel 74 and a conical integral inner portion 80 to which a separate conical support member 82 may be secured to provide rigidity, the assembly being secured to the plate 66 by means of the bolts 84. The front member 76 and the rear channel member 74 of the assembly 72 are secured together by means of a plurality of vane shaped column assemblies 86.

As seen best in FIGURES 5, 9 and 10, which are enlarged views, the columns comprise a pair of vanes 88 welded to side plates 90 and 92 and an end plate 94, to which support brackets 96 and nuts 97 may be welded to receive bolts by which the columns 86 may be attached to the rear channel member 74. The other end of the column may be notched to permit insertion thereof into the channel portion 78 and welding thereto.

Between each column 86, of which there are preferably three to provide rigidity, are positioned an appropriate number of vanes 98, which are shaped and positioned in the same manner as the vanes 88 comprising the columns and secured in any desired manner such as by welding one end thereof to the channel portion 78. A continuous suitable fabric filter strip 100 is then woven between the vanes 98, the edges of the strip 100 being cemented to the channels 78 and 74 so that air cannot pass by the edges of the strip. The ends of the column 86 and the vanes 98 positioned in channel 74 are not welded so that the strip 100 can be replaced, but the vanes 98 may also be cemented to add rigidity thereto.

With the above construction, there is provided a freely rotatable filter drum 72 mounted in a manner so that all of the air drawn into the engine intake 16 by the engine compressor must pass through the filter fabric 100, except for the clearance between the two nesting channel members 70 and 74 at the rear of the filter drum. This leakage can be eliminated by the provision of a novel dynamic seal, which may take any one of several possible forms. The seal shown comprises a pair of frustro-conical rings 102 and 104 formed by cutting or molding a resilient material such as Teflon. One edge of each ring is engaged in any suitable manner on the end of the filter drum, as in the slots 106 formed in the ring 108 secured to channel member 74, the ring being formed so that the other edge thereof continuously bears on the fixed or non-moving channel 70.

If only one ring were employed for the seal, it would be arranged like ring 104 so that the pressure differential between the outside and the inside of the drum 72 will maintain the free edge of the ring against channel 70. Where two such ring seals are employed, they may be arranged as shown in FIGURE 2, and a conduit extending through the rear wall 30 and the channel 70 at a point between the rings is provided to supply air under pressure from any source between the rings so as to force them outwardly and increase the sealing pressure. Since Teflon is a self-lubricating, as well as a wear resistant material, an increased sealing pressure will not result in frictionl drag on the filter drum. With the use of the dynamic seals, all of the air passing into the engine must pass through the filter strip 100.

The circular seal described above is particularly suited for low pressure sealing of a rotating member to a stationary member where low friction is desired. The salient features of this seal are as follows: (a) thin flexible sheet material, such as Teflon, is cut or molded to form a truncated conical shape, (b) one edge of the cone is held in a conical retainer, (c) the other edge seals against a smooth surface, (d) the pressure drop across the seal holds the rubbing edge of the seal in contact by forcing it to assume a longer radius of curvature than that of the conical form in which the seal was fabricated, putting the edge of the seal in tension and keeping it free of wrinkles, (e) the axis of the cone is concentric with the axis of rotation, (f) the seal may be used to seal the end of a cylinder to a flat surface, or to seal a cylindrical surface to a concentric cylindrical surface, etc., (g) the seal rings may be used singly or in pairs, (h) when used in pairs, the void between them may be pressurized, (i) the pressure connection may be made through the rotating member or the stationary member, and (j) one or both seals may be mounted to the rotating member or to the stationary member.

In FIGURES 2 and 5, the solid line arrows illustrate the flow of air to the engine, and it is apparent that flow of air through the fabric 100 will cause the filter assembly to rotate due to the number and arrangement of the vanes 98, the rate of rotation being dependent upon the rate at which air is drawn into the engine.

It will be understood that since all of the air supplied to the engine must pass through the filter media, it will ultimately become loaded or clogged with dirt particles removed from the air and choke the engine. Means are therefore, provided to intermittently or continuously clean the filter element during engine operation, this means comprising a so-called backflow nozzle of jet 110 secured, as by bolts through the openings 112 in the flanges 114, to the inside of the backplate 30 in a manner so that it extends longitudinally across the width of the filter strip 100. The particular jet shown in FIGURES 2, 8 and 9 comprises a hollow member formed in any suitable manner so as to be closed on all sides except for a slot opening 116 extending along the side thereof positioned adjacent the filter element 100. Means such as the adjustable strip 118 secured by flat head screws 120 in counter-sunk openings 122 elongated across the width of the strip 118 may be provided to adjust the width of the slot.

The jet 110 is supplied with high pressure air by means of a conduit 124 leading from a source of air, such as the engine compressor discharge, and the air is thus blown back through the filter strip 100 as shown by the dotted line arrows so as to remove dirt from the outside thereof. Flexing of the strip aids in removal of caked dust.

If it is desired to have intermittent cleaning action e.g., only when the filter element is clogged to the extent that it results in a predetermined pressure drop between the outside and the inside thereof, a pressure tap 126 may be provided to sense the pressure inside the drum 72, the tap being connected to a pressure responsive valve 128 adapted to open and close the backflow conduit 124 so as to provide intermittent cleaning operation. A simple vibrating reed 130 or other suitable device may be employed in conjunction with the jet so as to cause sonic vibration in the cleaning air, the effect of sonic vibration being now well-known in the field of cleaning.

To prevent dirt blown off the outer surface of the filter strip 100 from contaminating the inside of the aircleaner 18, a portion of the casing 36 opposite the jet 110 is cut away at 132 and an open duct member 134 is inserted through the opening and secured, as by means of bolts 135 through the holes 136 in the cover member 138 welded to the duct, to the outer casing at a point opposite the jet 110. The duct member is formed with laterally extending flanges 140 shaped to conform to the outer circumference of the filter drum and positioned in close proximity thereto, thereby providing an area seal. In this configuration, the dust particles collected on the outer surface of the filter strip are continuously or intermittently blown off the surface of the strip and into the atmosphere through the duct 134. Alternatively, a hopper 142 (FIGURE 4) may be secured to the bottom open end of the duct 134, the bottom of the hopper having a conduit 144 through which dust may be collected by the application of a negative pressure thereto.

It may be desirable, in connection with an intermittent type reverse flow cleaning system wherein the pressure drop across the filter element is sensed, to accumulate air from a source such as a compressor discharge bleed to provide sufficient volume of air to perform the cleaning function. The bleed may then be made relatively small so as not to compromise engine performance. Such a system is shown in FIGURE 3 wherein air bled from the engine compressor through the conduit 146 is collected in an accumulator tank 148 and intermittently discharged therefrom for the cleaning operation whenever the pressure responsive valve 128 opens the conduit 124, the conduit 146 being provided with a one-way check valve 150.

It has been found that an aircleaner of the construction shown and described, may be constructed in a size that is readily received within the available space in the usual vehicle engine compartment and that has sufficient capacity to supply the engine with the required amount of clean air.

The self-cleaning feature is made possible by the rotating filter element, and no external power source is required to rotate the filter element, rotation resulting automatically due to the flow of the air through the vanes. Weaving the filter strip 100 over the vanes 98 not only provides support for the strip while allowing some flexure thereof to assist the cleaning, but it also simplifies and reduces the size of the aircleaner. Furthermore, the greater the engine speed, the greater the need for clean air and the faster the cleaner will get clogged with dirt; however, greater engine speed also increases the rotational speed of the filter drum, resulting in more rapid cleaning due to the fact that the drum passes the jet more often, whether the cleaning be intermittent or continuous.

The novel seal structure helps to assure that all air supplied to the engine is clean.

Another important function of the device 18 is silencing. As already stated, a main source of objectionable noise is the engine air compressor itself, the noise being omitted from the compressor and out through the air inlet 16 of the engine.

The particular configuration and arrangement of the device 18, including the frustro-conical case 36 and the conical portion 80 of the front end of the filter drum 72, is such that any sound wave emitted from the air inlet 16 would, if the inner surfaces of device 18 were not sound absorbing, be reflected at least twice from the inner walls of the device 18, the second reflection usually being back toward the air inlet source of the sound, as shown by the dot-dash line arrows. In other words, there are very few, if any, possibilities of sound waves being emitted at angles such that they can escape through the annular air inlet 50 to the atmosphere where they may reach the human ear. It should be noted that silencing would also be enhanced by the fact that the annular air inlet 50 surrounds the engine air inlet 16; since the angle of reflection is equal to the angle of incidence, it would be impossible for a sound wave emitted from the engine inlet 16 to reflect off the conical portion 80 and out the annular inlet 50. The vanes are also positioned in a manner so that they lie in the path of the sound waves and tend to reflect them toward the shell 36. In addition, however, the inner surfaces of the device 18 are preferably coated with sound absorbing material 146 so as to absorb and/or diffuse (see the small arrows at A and B) the sound waves and reduce the reflection thereof from the various internal surfaces. The sound absorbing material extends all the way to the air inlet 50 so as to finally absorb any already diffused sound waves that may by chance otherwise find their way out of the device 18. There is thus a minimum opportunity for sound waves to escape through the inlet 50.

It will be noted that the concave portion 80, in addition to its contribution to the silencing function, also provides a convenient space for the bearing and shaft assembly 54, thereby reducing the dimensions of the device 18 in the axial direction.

With the above construction, it will be apparent that an air silencer and aircleaner has been provided that fulfills, or substantially fulfills, the objects recited above. While one embodiment of the device has been shown and illustrated, it is apparent that other modifications thereof are possible, and no limitations are intended except as recited in the appended claims.

What we claim as our invention is:

1. A combination aircleaner and silencer device adapted for mounting on the air intake of a gas turbine engine, comprising a generally circular housing having front and rear walls and a peripheral wall, a generally cylindrical filter drum free of any internal structure and having a closed end and on open end, said closed end being positioned adjacent said front wall and the major portion thereof being formed with a cavity on the side thereof adjacent said front wall, shaft and bearing means in said cavity rotatably mounting said drum to said front wall of said housing and within said housing and a dynamic seal between said open end of said drum and the adjacent rear wall of said housing whereby air to be cleaned must pass through the peripheral areas of said filter drum and be discharged through said open end thereof, the portion of said closed end forming said cavity being disposed internally of said drum at an angle such that substantially all of said air is deflected therefrom and through said open end, the outermost periphery of said drum comprising a plurality of vanes positioned so that flow of air through said vanes rotates said drum.

2. The combination of a gas turbine engine having a generally cylindrical outer housing formed with an air inlet and including an air compressor, said inlet and said compressor being substantially axially aligned, and an aircleaner and silencer device for said engine, said device comprising a housing having front and rear walls and a peripheral wall therebetween, said rear wall having an axial opening therein with means for sealably mounting said rear wall over said engine air inlet, said housing containing a rotatable concentrically disposed filter drum, the front end of said filter drum being closed and the other end thereof having an opening communicating with said air inlet and means cooperating with said rear wall to provide a moving seal between said drum and said rear wall, the outer peripheral portion of said drum being formed by a plurality of spaced vanes, filter media woven over said vanes such that air flowing through said filter media impinges upon said vanes and causes rotation of said drum at a speed related to the speed of the engine, said drum being mounted for rotation at the front end only, said front end of said drum having a depression formed therein to provide an outer cavity and an inner projection extending toward said air intake, means disposed in said cavity rotatably mounting said front end of said drum to said front wall of said housing, said projection being at an angle such that sound waves emanating from said air intake are deflected against the inner surface of said peripheral wall of said housing and air passing radially through said filter media is deflected substantially axially into said air intake, the direction of flow of said air being in opposition to the direction of travel of said sound waves as they leave said air intake, said deflecting surfaces having a sound-absorbing material thereon, said air compressor having an air bleed opening, an air jet extending across the inner surface of said filter drum, a conduit extending between said bleed opening and said jet, a pressure responsive valve in said conduit, a branch conduit between said pressure responsive valve and the inside of sure within said filter to said pressure responsive valve, said filter drum to continuously communicate the pressure within said filter to said pressure responsive valve, whereby compressor air is supplied to said jet for reverse flow through said filter media to clean the same as it passes by said jet only when said pressure within said filter drum reaches a predetermined lower pressure indicative of a clogged filter needing cleaning, and means for conducting matter removed from the outside of said filter media by said reverse flow jet from said housing, a peripheral opening in said peripheral wall through which ambient air to be cleaned and supplied to the engine passes radially, through the clearance between said filter drum and said housing, radially through said filter media and then by deflection off said projection and axially into said air intake.

References Cited
UNITED STATES PATENTS

| | | | |
|---|---|---|---|
| 2,341,771 | 2/1944 | Hagar | 455—403 X |
| 2,474,478 | 6/1949 | Hart | 55—404 X |
| 2,665,929 | 1/1954 | Sawyer | 277—25 X |
| 2,720,279 | 10/1955 | James | 55—276 X |
| 2,732,912 | 1/1956 | Young | 55—290 |
| 2,765,048 | 10/1956 | Hersey | 55—294 |
| 2,776,024 | 1/1957 | Fowler | 55—294 |
| 2,818,283 | 12/1957 | Hutterer | 277—152 |
| 2,823,656 | 2/1958 | Dolza | 55—400 X |
| 2,871,976 | 2/1959 | Sebok | 55—276 |
| 2,898,132 | 8/1959 | Guerin | 277—25 X |
| 2,368,787 | 2/1945 | Skinner | 55—278 X |
| 2,608,952 | 9/1952 | Herbert | 210—354 X |
| 3,032,954 | 5/1962 | Racklyeft | 55—400 X |
| 3,187,898 | 6/1965 | Baker | 210—354 X |
| 3,298,149 | 1/1967 | Sobeck | 55—318 X |
| 2,947,381 | 8/1960 | Cook et al. | |
| 2,962,120 | 11/1960 | Lagarias | 55—292 |

(Other references on following page)

UNITED STATES PATENTS

| | | | |
|---|---|---|---|
| 2,994,407 | 8/1961 | Van Diepenbroek | 55—317 |
| 3,016,109 | 1/1962 | Howard | 55—294 |
| 3,073,097 | 1/1963 | Hallett et al. | 55—283 |
| 3,107,987 | 10/1963 | Duer | 55—404 X |
| 3,116,990 | 1/1964 | Duer | 55—404 X |
| 3,192,686 | 7/1965 | Berkey et al. | |
| 3,209,520 | 10/1965 | McKinlay | 55—498 X |
| 3,212,239 | 10/1965 | Maestrelli | 55—302 X |

FOREIGN PATENTS

| | | |
|---|---|---|
| 174,063 | 8/1906 | Germany. |
| 329,240 | 11/1920 | Germany. |
| 601,750 | 5/1948 | Great Britain. |
| 979,404 | 1/1965 | Great Britain. |

HARRY B. THORNTON, *Primary Examiner.*

D. TALBERT, *Assistant Examiner.*